(12) United States Patent
Ostrover et al.

(10) Patent No.: US 8,594,484 B2
(45) Date of Patent: Nov. 26, 2013

(54) DVD PLAYER WITH EXTERNAL CONNECTION FOR INCREASED FUNCTIONALITY

(75) Inventors: Lewis S. Ostrover, Los Angeles, CA (US); Bradley T. Collar, Valencia, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1281 days.

(21) Appl. No.: 11/748,695

(22) Filed: May 15, 2007

(65) Prior Publication Data

US 2008/0285961 A1 Nov. 20, 2008

(51) Int. Cl.
*H04N 5/775* (2006.01)

(52) U.S. Cl.
USPC .......................................... 386/230

(58) Field of Classification Search
USPC .......................................... 386/230
See application file for complete search history.

(56) References Cited

U.S. PATENT DOCUMENTS

| | | | |
|---|---|---|---|
| 3,436,473 A | 4/1969 | McMann, Jr. | |
| 5,774,435 A * | 6/1998 | Hirano | 369/47.22 |
| 6,529,604 B1 | 3/2003 | Park et al. | |
| 6,546,053 B1 | 4/2003 | Ishii | |
| 7,278,166 B2 * | 10/2007 | Inokuchi et al. | 726/28 |
| 2002/0009137 A1 | 1/2002 | Nelson et al. | |
| 2002/0170954 A1* | 11/2002 | Zingher et al. | 235/375 |
| 2002/0199018 A1* | 12/2002 | Diedrich et al. | 709/245 |
| 2003/0108341 A1 | 6/2003 | Oshima et al. | |
| 2003/0194211 A1* | 10/2003 | Abecassis | 386/69 |
| 2004/0047191 A1* | 3/2004 | Inoue | 365/200 |
| 2004/0240860 A1 | 12/2004 | Bruls et al. | |
| 2005/0044293 A1* | 2/2005 | Wu | 710/52 |
| 2005/0185937 A1 | 8/2005 | Comer et al. | |
| 2005/0259147 A1 | 11/2005 | Nam et al. | |
| 2006/0062294 A1 | 3/2006 | Lin et al. | |
| 2006/0133493 A1 | 6/2006 | Cho et al. | |
| 2006/0177199 A1 | 8/2006 | Horiguchi et al. | |
| 2006/0193608 A1* | 8/2006 | Kim | 386/126 |
| 2006/0209645 A1* | 9/2006 | Wei et al. | 369/44.25 |
| 2006/0238724 A1* | 10/2006 | Trivedi | 353/119 |
| 2007/0118764 A1* | 5/2007 | Peng et al. | 713/193 |
| 2007/0174624 A1* | 7/2007 | Wolosewicz et al. | 713/176 |
| 2007/0226620 A1* | 9/2007 | Togashi | 715/700 |

OTHER PUBLICATIONS

Supplementary Partial European Search Report & European Search Opinion, European Patent Office, Munich, Germany, Apr. 13, 2012.

* cited by examiner

*Primary Examiner* — Thai Tran
*Assistant Examiner* — Jose Mesa
(74) *Attorney, Agent, or Firm* — Gottlieb, Rackman & Reisman, P.C.

(57) ABSTRACT

The present invention pertains to an optical disc player with a standard digital port, such as a USB port, coupled to an external storage, such as a thumb drive, coupled to a standard digital port such as a USB port. The external storage, may also be used to provide content, commands or applications that enable the player to present certain additional content, or to perform certain additional or enhanced functions.

2 Claims, 2 Drawing Sheets

DVD PLAYER WITH EXTERNAL CONNECTION FOR INCREASED FUNCTIONALITY

RELATED APPLICATIONS

None

BACKGROUND OF THE INVENTION

1. Field of the Invention

This invention pertains to a player of optical discs, and more particularly to a player for optical discs or other similar devices providing content to an end user and having an external port used for controlling and extending the memory and functions of the player based on commands or other data from an external storage device coupled to said external port.

2. Description of Prior Art

Early optical disc players, used for example to play compact discs (CDs), essentially duplicated the functionalities of magnetic tape or record players. Since these latter devices were analog devices, they were able to perform only limited—mostly linear—functions beyond merely reproducing music or other sounds or video. The more recent optical disc players, including standard DVD players and the newer high capacity players, such as Blu-ray and HD DVD (nigh definition DVD) players, can play back both audio and video and can perform many additional control of content functions, especially if they are connected to a network. Presently, content is made available to users through a variety of media, such as reed only memory (ROM) optical discs, having structures which do net allow the content to be changed or updated. This limitation precludes users from easily availing themselves of updated content for play back.

In addition, current disc players and other playback devices are generally software and firmware driven. The storage for such control is generally limited, which precludes complex manipulations such as those required for complex interactive games.

In addition, the software and firmware often require updating to correct erroneous functions, to improve the operation of the devices, or to make the devices compatible with new types of discs or disc formats. However, the usual mechanisms available until now for updating the software in disc playback devices have been labor intensive and have included returning the device itself to the retailer or service center to change the firmware within the device; obtaining a disc that includes updated firmware; or downloading the update through an internet connection (if available). These mechanisms vary in easy of use and efficacy by user and form of update.

Finally, present devices for playing discs are capable of presenting the content from the discs on a screen but generally cannot be used for rapid response to user stimuli, for example to play sophisticated games. Nor can most present devices present 3-D images unless the original content is encoded for this purpose.

SUMMARY OF THE INVENTION

Because of the ever changing nature of content, there is a present need for means by which updated command or application information can be provided (1) to control how a disc player presents or renders the content from a disc and (2) for additional content from external sources.

The present invention overcomes the aforementioned limitations of play back of a ROM-device by affecting users the ability to update or add content applications, persistent memory, or storage, and to enhance pre-existing content or applications through the use of external data storage (such as a Universal Serial Bus or USB-connected thumb drive).

In addition, by providing a mechanism for firmware or other application updates or upgrades, users are saved the costs and bother of returning the device, obtaining and running a disc for updates, or downloading updates via an online connection.

Applications for adding content to a ROM-based disc are envisioned. For example, a disc provided for entertainment could include a movie, but several different endings, outtakes, trailers or commentaries may be generated and distributed separately to licensees after the original discs are made. Alternatively, additional content that would otherwise not fit on an optical disc can be provided by alternate means thereby eliminating the need for multiple discs.

In another example, discs are provided with some basic summary or introductory content related to entertainment or education. Subsequently other means may be used to provide additional, comprehensive or updated content to enhance what is on the original discs. As before, the additional material may include additional commands, user interface data, or other content, e.g. high-bandwidth content.

Such updates may, at least in part, be determined at the user's discretion. The user may also be able to search and download or stream future content based on areas of interest. For example, a disc may be instructive of a particular country, but the user may have additional interest regarding a particular city. The additional material may be available through various content distribution schemes, e.g., outright purchases, licenses, or subscription services, that may be limited in different ways, such as temporally, territorially, etc. The need to provide frequent updates and more current information for applications also frequently arises with education-oriented content, where, for example, topical materials might have a significant impact for helping a student in a particular subject, such as history. The need to provide updates and current information for applications also frequently arises for entertainment material, where, for example, topical content or applications materials might have a significant impact for additional entertainment value.

To summarize, an optical player is presented that has a standard digital port for coupling to an external device that provides data to the player. The data may include content that augments or is combined with content from an optical disc, and/or control data, including data updating the software or firmware of the player. The external device may be a data storage device, such as a thumb drive containing codes to enable the player to perform or enhance various functions, content that may be mixed with content from a disc for presentation to the user, new content or some combination. Data from the external storage can be accessed directly, or can be downloaded into the limited (low capacity) internal data storage means of the player. Once data are downloaded into the player's persistent or internal storage, they may be used for their intended purpose even after the external storage is removed and/or the optical disc is removed, e.g., a different disc is inserted. Alternatively, or in addition, the external device may be a gateway through which data is fed to the optical player.

DETAILED DESCRIPTION OF THE INVENTION

Figure 1:
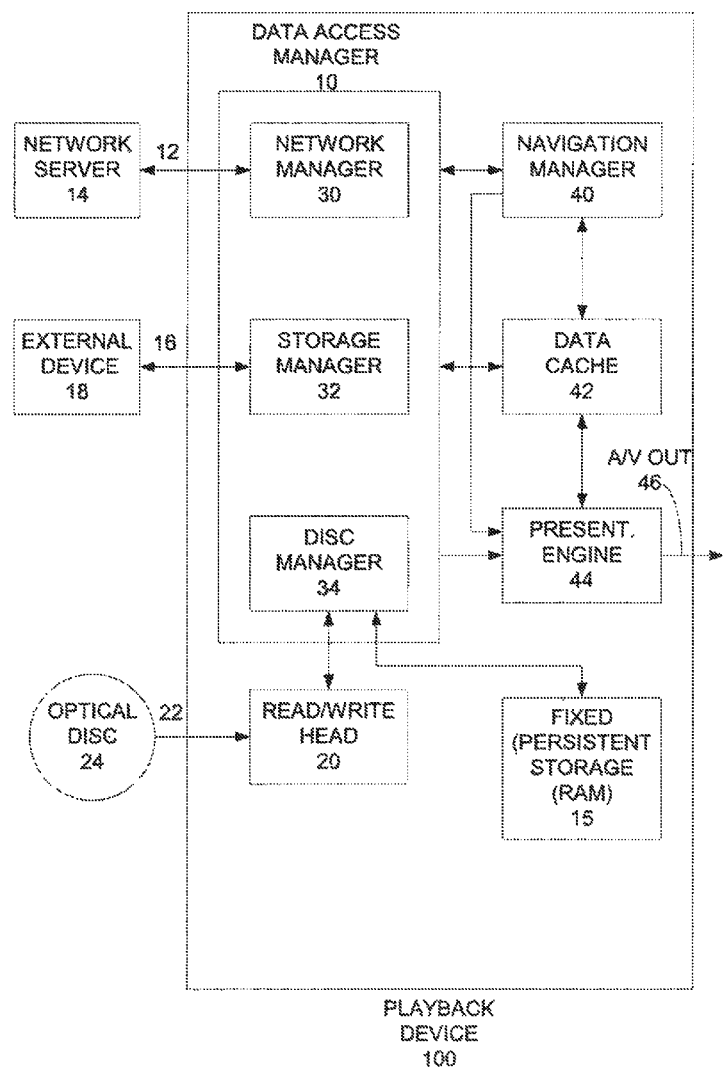
FIG. 1 shows a block diagram of an optical disc player with an external port in accordance with this invention.

Referring first to FIG. 1, an optical disc player or other similar device 100 constructed in accordance with this invention includes a data access manager 10, a fixed storage component 15, a read head 20, a navigation manager 40, a cache 42 and a presentation engine 44.

The data access manager 10 controls data communication with the outside world and is connected to a port 12 coupled to a network server 14. The port 12 could be an Ethernet port, a wireless port, a connection to a telephone or cable modem, etc. Through the network server 14, the date access manager 10 can access information from a public or private network (not shown).

The standard fixed data storage 15 can be a standard persistent data storage component such as a solid state random access memory (RAM) including a hard drive. Storage 15 is used to store software and content data for the operation of the player 100. The data in storage 15 can be deleted or altered by the user or by software components from the optical disc 24.

Presently, the size or storage capability of data storage 15 is rather limited. Typically this storage has a capacity range of 128 Mb to 1 Gb which is not enough to provide sufficient persistent data or to contain commands or applications for many extended functions for the player 100.

The player 100 further includes a port 16 used for establishing communication with an external device 18. In the preferred embodiment of the invention, the device 18 is an external data storage device. For example, the device 18 may be a thumb drive with a male USB connector, in which case the port 16 is a female USB connector. Presently several manufacturers make thumb drives having up to 4 Gb of memory or more. Other types of removable devices may be used as well.

The read/write head 20 is associated with a tray or other similar means 22 for accepting an optical disc 24. The optical disc 24 is used to store information including both content and data associated with the content. The means 22 presents the disc 24 to the head 20 which then reads the information from the disc 24 and presents it as data and/or commands to the data access manager. Optionally, data may also be written or burned onto disc 24 by head 20 if the player 100 is a read/write device.

The data access manager 10 (and indeed most of the other components of the device 100) can be microprocessor controlled however it is shown here with discrete components for the sake of clarity. The manager 10 thus includes a network manager 30 that controls information exchanged with the network server 14 through pod 12, a storage manager 32 that controls the information exchange with fixed storage 15 and the external device 18 and a disc manager 34 that controls the data flow from the optical disc 24.

The navigation manager 40 controls and manages the flow of information between the various components of player 100, in accordance with commands from the program in storage 15, disc 24, or external device 18. The manager 40 also resolves conflicts between the various components, including conflicts with commands from the disc 24 and external device 18. The player 100 can be programmed so that commands from fixed storage 15 can override and, if applicable, replace commands in the disc 24.

The data cache 42 is a fixed, non-removable component that can be used to store data from storage 15, disc 24, or network server 14 for the use by the presentation engine 44 or the navigation manager 40. The data cache 42 may also be used as a data buffer.

The presentation engine 44 decodes and processes the graphics, text, fonts, audio, and video signals from disc 24 and data cache 42, potentially modified by instruction from navigation manager 40, and uses these decoded signals to generate corresponding output signals on output port 46. The port 46 may include several typos of audio/video output devices using different plugs and protocols, such as HDMI, VDI, component, S-video, composite, RF, S/PDIF, etc.

In one embodiment, the external device 18 allows the player 100 to perform various functions that are either not available without the device 18, or that take less time and make better or more efficient use of the available resources. Data from external device 18 can be used to change, update, or otherwise augment the functionality of player 100 in several ways, including the operation of the player 100 itself, the data exchange with network server 14, the content downloaded from the disc 24, and/or data presented by engine 44.

In particular, the external device 18 may be used as a means for controlling the playing of content. If the player is a recorder as well, data from the external device 18 may be used to control the recording.

In another embodiment of the invention, the player 100 may be modified so that at least some of the discs inserted into the player can be played only if the proper external device 18 is inserted in port 16. That is, when a disc 24 is inserted, the disc manager 34 retrieves data from the external storage device 18. The disc 24 is played only if the correct authorization code or playback license transaction support is included on the external device 18. For this situation, the device 18 is sold to the end user at the same time as the disc, or is sold separately. The data in the external storage is preferably encrypted and digitally signed so that it cannot be easily duplicated and run without authorization, and is then decrypted and authorized by the disc manager 34.

As discussed above, a problem with existing DVD players is that their software or firmware is not easy to update without laborious effort. In another embodiment of the present invention, the external device 18 contains updating data. The device 18 is coupled to the device 100, the device 100 checks the content of the external device 18 (either automatically or in response to a user input) and if upgrade data is found, this data is used to upgrade the software or firmware of device 100.

In an alternate embodiment, the player 100 is a recorder/player that has the ability to burn a new disc and copy the content from an old disc or from other sources, including the external device 18 itself. In this situation, the external device 18 has DRM-type information. This information is used to control the copying of the old disc. For example, when an end user requests that content be copied on a new disc, the disc manager 34 checks if such a copying is allowed by data in external device 18. If copying is not expressly allowed, or if a proper external device 18 is missing, then the copy function is disabled.

Another use of the external device 18 is to complement the operation of the fixed storage 15 and/or the cache 42. A typical player 100 is constructed and arranged to present to a viewer a standard linear program from a disc, i.e., a DVD, in which scenes are played in a predetermined order and sequence. Of course, the user can stop the sequence of scenes, "rewind" to a previous location or scene in the program, skip "forward," and generally perform the normal functions associated wife viewing such linear programs. It should be noted that HD DVD and (Blu-ray) discs support scene bookmarks and some very limited non-linear presentation of content. However, some programs are or may become available for discs that are not to be played linearly but require more complex data manipulation which cannot be performed efficiently (if at all) by the standard player. For example, complex interactive games normally receive complicated commands from users and, in response, require complex data manipulations for presenting the game's audio and visual components. In this situation the external device 18 is used to provide increased data storage to facilitate the playing of interactive games. The external device 18 may also be used to provide software elements for the game that are not included on the disc either because of space limitations, or because the software elements have not been made available until after the release of the disc.

In another embodiment, a disc is released with some basic audiovisual elements and the external device 18 is released separately. For example, the disc may contain a geography lesson with some economic information missing. The missing information may include the latest demographics on the population, industrial production, economic data, political data, etc. The missing information is then released at a later date, or at regular intervals by the external device 18. The player 100 then plays the program from the disc and fills in the missing information from the external device 18.

In the embodiments described above, the external device 18 is used to enhance the functionality of the play back of the player 100 itself. In other embodiments described below, information in the external device 13 is used by the presentation engine 44 in generating what or how content is presented. In one embodiment, a portion of the content from the optical disc 24 is replaced by new content from device 18. For example, the disc 24 may include content including the video component of a program and an audio component including dialog and subtitles in English and Spanish but not French. The device 18 may include dialog and subtitles in French. The presentation engine 44 then uses the information from the device 18 to generate a program with French dialog and subtitles properly interspersed with the unchanged video portion of the system.

In another example, the content includes a program with several sequential scenes. The external storage includes new content with at least one new scene and commands or instructions identifying where in the program the new scene is to be played, and whether the new scene follows or replaces one or more scenes from the original content from disc 24.

In yet another example, the disc includes content with a simple stereo audio channel. The device 18 contains a secondary audio channel for enhancements to the disc's audio channel together with switching or mixing applications. The secondary audio material can be used to replace or mix with the original audio channel, or to complement the same.

In yet another example directed at the educational field, the content on disc 24 includes a test with several questions. The device 18 includes answers to the questions. The engine can then show each question followed by the respective answer, all the answers can be presented after the questions, or the sequence of questions can be adjusted based on the students answers, thereby re-testing similar topics or increasing the degree of difficulty of the questions.

Similarly, the disc includes content with a program having a video component for displaying images on a standard two-dimensional display. The external device 18 can include content with information and application software that is combined with the disc's video component by the players presentation engine to generate three-dimensional or holographic images. The end user can then be given the choice of watching a program as a flat image or as a three-dimensional image.

Other embodiments of the invention certain to the functions of the player 100 associated with the network server 14. In a simple embodiment, the port 12 is normally disabled and the player 100 cannot communicate with network server 14. Insertion of device 18 into port 16 enables the port 12 thereby allowing communication with the server 14.

In another embodiment, the device 18 contains a web address for information to be obtained by the player 100. In this case, once the device 18 is inserted, the player 100 obtains from device 18 the address and then contacts the respective website to download or upload information.

Figure 2:
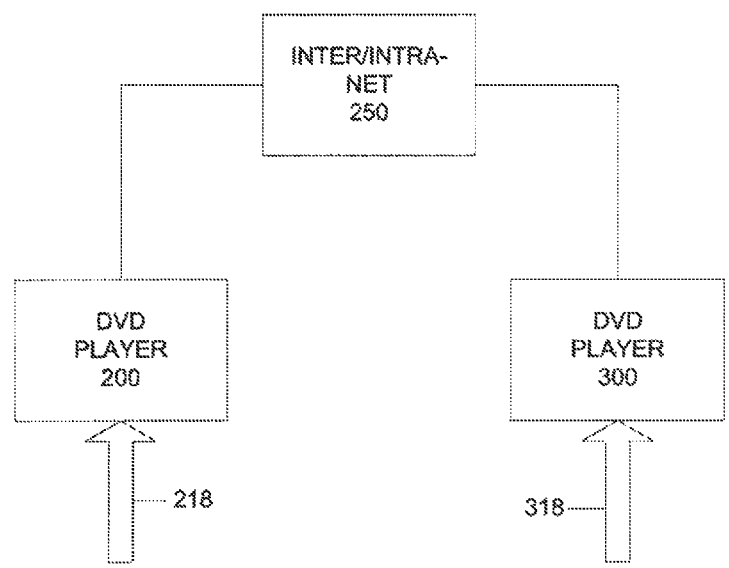
FIG. 2 shows a block diagram of a system of two or more interconnected optical disc players and/or other devices.

In yet another embodiment, shown in FIG. 2, two devices 200, 300 similar to player 100 shown in FIG. 1, are used interactively by two players to play a game. The two devices are interconnected via an inter- or intra-net 250 and each has an external storage devices 218, 318 respectively. The two external devices contain various information necessary for the two players to play, inducing, e.g., IDs, website information, etc.

In another embodiment of the invention, the external device 18 may provide other functions as well. For example, the device 18 may include a geographic locator such as a Global Positioning System, that receives signals from external sources (e.g., satellites, cell towers, etc.) and uses these signals to identify its location, and therefore the location of device 100. The combination of a geographic locator and a disc player can be used for various types of presentations. For example, the player 100 can be a portable player that is being carried around by a mobile user. The player 100 could provide an interactive presentation related to specific geographic features, attractions, etc., found at or near the current geographic location of player 100.

In another embodiment, device 18 includes an internet gateway that provides the player with current content mixed with content from the disc for presentation to the user. For example, the player 100 may be used for playing a game repairing realistic or even live content, such as a simulated car race. As the player 'drives' a vehicle, live scenery may be downloaded through device 18 and presented as the scenery. Alternatively, or in addition, real-time geographic information, such as current maps or satellite pictures are downloaded to the player 100 which then blends them with the virtual imagery of the game. This embodiment is particularly useful for players that either do not have a separate access to the network server 14, or require specific connection to the server (e.g., a wired connection) that may not be available or convenient. In another embodiment if the external storage is removed, the respective functionality of the player is disabled. In yet another embodiment, a different external storage is required for each different optical disc.

In a further embodiment, the code on a DVD (need not be an HD DVD or Blu-ray, but could be) and the code on another DVD are used so that when the discs are played in connected players (e.g., connected PCs with DVD playback functionality) some features or functions are enabled by the discs' code such that these features or functions are not supported absent either of the discs. Similarly, in a single PC player environment or non-connected environment, the code on one disc could be copied into the PC's persistent storage (i.e. Hard disc) and when this disc is ejected and the next disc is played, features or functions that rely on the first disc's code are enabled. Conversely, features or functions that would have been prohibited in playing back the second disc are enabled once the first disc's code is loaded. This has some particularly interesting implications for use of combination DVD/HD-DVD discs (or other combination discs) such that absent both sides/layers, the necessary code to enable some features or functions will not be available, so pirate versions of just the HD DVD portion, e.g. will not have the necessary code.

Thus, the functionality of the player is modified by (a) using a removable storage device to supplement a disc player's persistent storage; (b) by using a removable storage device inserted into a disc player to introduce code without which some player functions can not work; (c) with the code in the data storage, some player functions are enabled (and are disabled when the storage device is removed); (d) using a removable storage device to introduce codes without which some disc functions can not work; (e) conversely, with the code from a storage device, some functions are enabled (and disabled with the storage device is removed); (f) using a removable storage device inserted in a disc player to introduce some codes without which some network-connected transactions can not work; (g) conversely, with the code from the storage device, some functions are enabled but disabled if the storage device is removed; (h) using two external devices in two disc players to allow the two players to exchange data over a network.

While the invention has been described with reference to several particular embodiments, it is to be understood that these embodiments are merely illustrative of the principles of the invention. Accordingly, the embodiments described in particular should be considered exemplary, not limiting, with respect to the following claims.

We claim:

1. An optical disc player for reading an optical disc comprising:
   a housing;
   an optical head in said housing arranged to receive the optical disc through said housing and to read disc content from the disc;
   a presentation engine in said housing arranged to present program signals corresponding to said disc content and including audio and video components to an output port;
   a controller in said housing arranged to transmit said disc content from said optical disc to said presentation engine;
   an external port accessible through said housing; and
   an external device removably attached to said external port through said housing;
   wherein said external disc contains enabling data, said controller being arranged to present said program signals only when said external device is connected through said external port to said controller.

2. An optical disc player for reading an optical disc comprising:
   a housing
   an optical head in said housing arranged to receive the optical disc through said housing and to read content from the disc;
   a presentation engine in said housing arranged to present program signals corresponding to said content and including audio and video components to an output port;
   a controller in said housing arranged to transmit said content from said optical disc to said presentation engine;
   an external port accessible through said housing; and
   an external device removably attached to said external port through said housing and storing external data including at least one of commands and external content;
   wherein said head is used selectively to read data from said disc and to selectively write content on another disc when data writing on the another disc is permitted by the external data on the external device.

* * * * *

UNITED STATES PATENT AND TRADEMARK OFFICE
CERTIFICATE OF CORRECTION

| | | |
|---|---|---|
| PATENT NO. | : 8,594,484 B2 | Page 1 of 1 |
| APPLICATION NO. | : 11/748695 | |
| DATED | : November 26, 2013 | |
| INVENTOR(S) | : Lewis S. Ostrover et al. | |

It is certified that error appears in the above-identified patent and that said Letters Patent is hereby corrected as shown below:

In the claims:

Claim 1, Column 8, line 10, change "disc" to -- device --

Signed and Sealed this
Twenty-fifth Day of February, 2014

Michelle K. Lee
*Deputy Director of the United States Patent and Trademark Office*